No. 778,235. Patented December 27, 1904.

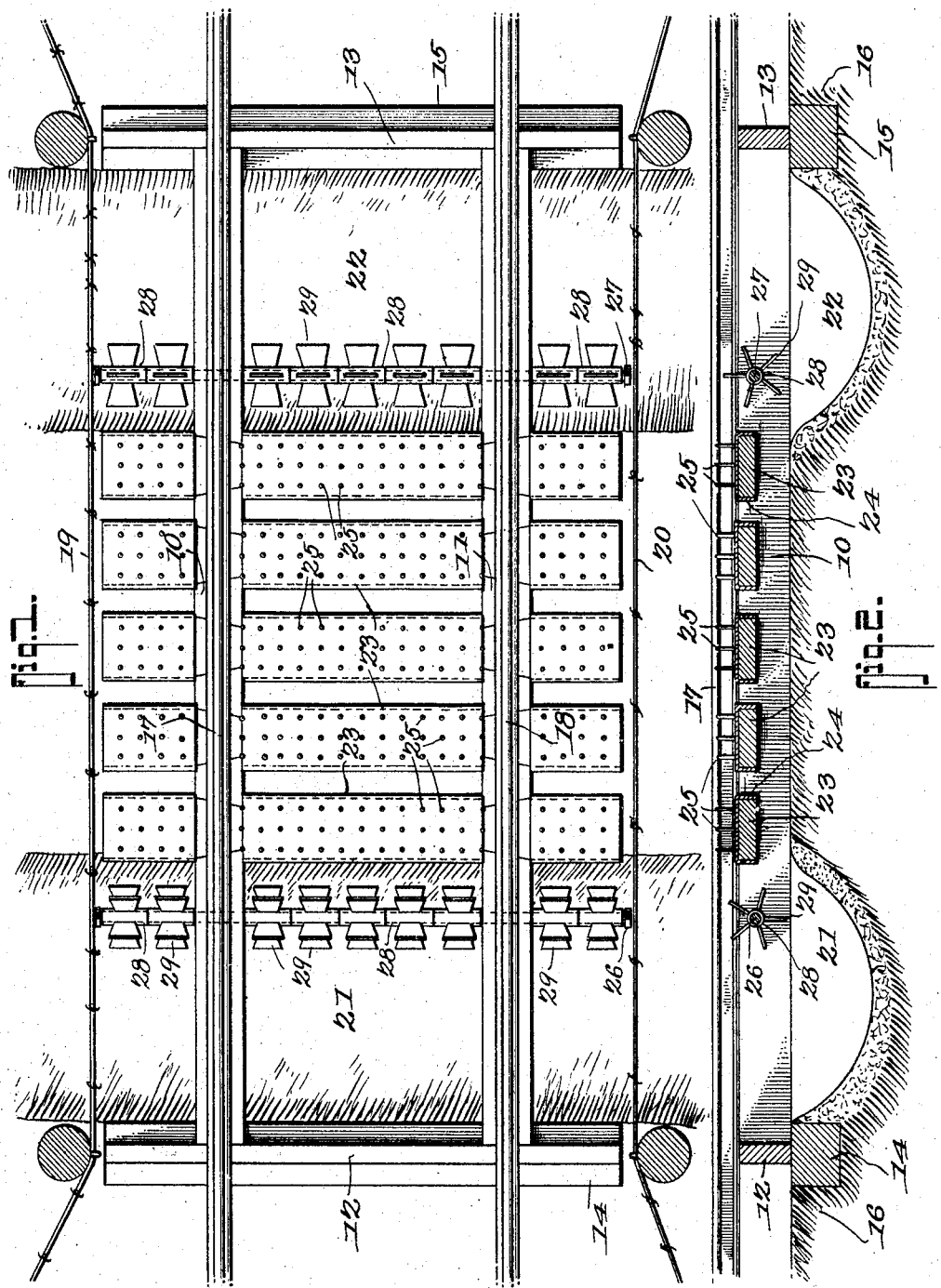

UNITED STATES PATENT OFFICE.

JAMES ALBERT FERRIEEL, OF NEWHAVEN, KENTUCKY.

CATTLE-GUARD.

SPECIFICATION forming part of Letters Patent No. 778,235, dated December 27, 1904.

Application filed September 17, 1904. Serial No. 224,880.

*To all whom it may concern:*

Be it known that I, JAMES ALBERT FER-RIEEL, a citizen of the United States, residing at Newhaven, in the county of Nelson and State of Kentucky, have invented a new and useful Cattle-Guard, of which the following is a specification.

This invention relates to cattle or stock guards for railways, and has for its object to improve the construction and increase the efficiency of apparatus of this character.

With these and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of the embodiment of the invention capable of carrying the same into practical operation, it being understood that the invention is not necessarily limited thereto, as various changes in the shape, proportions, and general assemblage of the parts may be resorted to without departing from the principle of the invention or sacrificing any of its advantages.

In the drawings thus employed, Figure 1 is a plan view, and Fig. 2 is a longitudinal sectional elevation of the same.

The improved device comprises spaced sill members 10 11, connected at the ends by transverse tie-plates 12 13, the latter resting upon ordinary cross-ties 14 15, embedded in the "ballast" 16. The railway-rails 17 18 rest upon the sill members and are secured thereto by spikes or bolts in the usual manner. The sill-pieces will generally be about sixteen feet long and about ten by twelve inches in transverse section, while the end members 12 13 will be of the same length as the ties 14 15, or about eight and one-half (8½) feet.

Sections of fencing, as at 19 20, are erected along the sides of the track opposite the sill members, and thus define the area to be guarded. Pits 21 22 are formed transversely beneath the sill members, next their ends, and extend beneath the fence-sections and are open at the ends, so that small animals falling therein can readily escape. The sill members are connected at suitable intervals between the pits by transverse tie members 23, the latter having "dovetailed" sections for fitting dovetail cavities in the members 10 11 to bind the sill members firmly together. The tie members 23 are covered for protection by sheet metal, as at 24 in Fig. 2, and also provided with numerous vertically-extending spurs 25, which reach nearly to a point even with the upper surfaces of the rails 17 18. The spurs may be of any desired size and any number may be employed, but will generally be formed of large spikes driven through the members 23, as indicated.

Extending transversely through the sill members 10 11, above the inner sides of the pits 21 22, are rods 26 27, upon which a series of sleeves 28 are mounted for rotation, the sleeves carrying radiating wings or blades 29. The winged sleeves are located both between the sill members and exteriorly of the same or between the sill members and fence-sections, thus filling the whole space between the fence-sections.

A device thus constructed and installed will effectually protect the railway-line at road-crossings or between fields, and any attempt of animals to pass thereover will be frustrated. Small animals, such as swine or the like, will tumble into the pits 21 or 22, and any attempt to climb out on one side will be effectually prevented by the rolling guards, and if the animal is too small to climb out from the same side at which it entered it can readily escape by passing beneath the sill members and the fence-sections. If larger animals, such as horses or cattle, attempt to pass and are not deterred by the pits 21 22 they will be effectually repulsed by the spurs in the members 23.

The device is simple in construction, can be readily installed at all forms of railway-crossings, and will very effectually prevent the passage of all sizes and kinds of stock.

The sheathing of the members 23 protects them and increases their durability and prolongs their "life." The rods will preferably be provided with binding-nuts on their ends to hold the winged sleeves in position. The fence-sections may be of any desired kind; but barbed wire will generally be employed as being more effective in repelling the animals who may come in contact therewith and likewise rendering it very difficult for pedestrians to pass the barrier offered by the coaction of the barbed fencing and spiked planks. The parts will preferably be painted in various colors, which will have the effect of repelling certain kinds of animals. The pits 21 22 will preferably be lined with concrete to insure retention of their symmetrical shape.

Having thus described the invention, what is claimed is—

1. In a cattle-guard, a pit extending transversely beneath the rails and open at the ends beyond the sides of the track and rotating guards disposed between the rails and adjacent to the outer sides of the same and above one side of said pit.

2. In a cattle-guard, a pit extending transversely beneath the rails and open at the end beyond the sides of the track and a plurality of independently-rotating guards disposed between the rails and adjacent to the outer sides of the same and above one side of the pit.

3. In a cattle-guard, fence-sections spaced apart along the sides of the track and defining the area to be guarded, pits disposed transversely beneath the rails at the ends of said guarded area and open at the ends beneath said fence-sections and rotating guards arranged between the rails and between the fence-sections and rails and above the inner sides of said pits.

4. In a cattle-guard, fence-sections spaced apart along the sides of the track and defining the area to be guarded, pits disposed transversely beneath the rails at the ends of said guarded area and open at the ends beneath said fence-sections, and a plurality of independently-rotating guards disposed between the rails and between the fence-sections and rails and above the inner sides of said pits.

5. In a cattle-guard, fence-sections spaced apart along the sides of the track and defining the area to be guarded, pits disposed transversely beneath the rails at the ends of said guarded area and open at the ends beneath said fence-sections rotating guards arranged between the rails and between the fence-sections and rails and above the inner sides of said pits and spaced members disposed transversely of the rails and between said pits and provided with spurs.

6. In a cattle-guard, spaced sill members for supporting the railway-rails longitudinally of the same, fence-sections spaced apart opposite the sill members, pits disposed transversely beneath the ends of said sill members and open at the ends and extending beneath said fence-sections, rods transversely through said sill members above the inner sides of said pits and guards having radiating wings and mounted for rotation upon said rods.

7. In a cattle-guard, spaced sill members for supporting the railway-rails longitudinally of the same, fence-sections spaced apart opposite the sill members pits disposed transversely beneath the ends of said sill members and open at the ends and extending beneath said fence-sections, rods transversely through said sill members above the inner sides of said pits, guards having radiating wings and mounted for rotation upon said rods, spaced member connecting said sill members between said pits and provided with vertical spurs.

8. In a cattle-guard, spaced sill members for supporting the railway-rails longitudinally of the same, fence-sections spaced apart opposite the sill members pits disposed transversely beneath the ends of said sill members and open at the ends and extending beneath said fence-sections, rods transversely through said sill members above the inner sides of said pits guards having radiating wings and mounted for rotation upon said rods spaced tie members having "dovetailed" cavities in said sill members and provided with vertical spurs.

9. A cattle-guard having a pit disposed transversely beneath the rails of a railway-track, and a rotatable guard disposed lengthwise of the pit adjacent the top thereof.

10. A cattle-guard having a pit disposed transversely beneath the rails of a railway-track with its top and opposite ends open, and a rotatable guard disposed lengthwise of the pit adjacent the top thereof.

11. A cattle-guard having spaced pits disposed transversely beneath the rails of a railway-track, a guard between the pits and provided with upstanding guard projections, and rotatable guards disposed lengthwise of the pits adjacent the tops thereof and at their inner sides.

In testimony that I claim the foregoing as my own I have hereto affixed my signature in the presence of two witnesses.

JAMES ALBERT FERRIEEL.

Witnesses:
BERNARD BOWLING,
GREEN B. PRICE, Jr.